US007667210B2

(12) United States Patent
Balaban et al.

(10) Patent No.: US 7,667,210 B2
(45) Date of Patent: Feb. 23, 2010

(54) WIDE-AREA FLUORESCENCE DETECTION SYSTEM FOR MULTI-PHOTON MICROSCOPY

(75) Inventors: Robert S. Balaban, Bethesda, MD (US); Christian A. Combs, Bethesda, MD (US); Jay R. Knutson, Bethesda, MD (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 0 days.

(21) Appl. No.: 11/979,600

(22) Filed: Nov. 6, 2007

(65) Prior Publication Data

US 2008/0063345 A1 Mar. 13, 2008

Related U.S. Application Data

(63) Continuation of application No. PCT/US2007/017478, filed on Aug. 6, 2007.

(60) Provisional application No. 60/835,462, filed on Aug. 4, 2006.

(51) Int. Cl.
*G01J 1/58* (2006.01)
(52) U.S. Cl. .................................. 250/458.1
(58) Field of Classification Search ............... 250/458.1
See application file for complete search history.

(56) References Cited

U.S. PATENT DOCUMENTS 5,034,613 A 7/1991 Denk
5,796,112 A 8/1998 Ichie
(Continued)

FOREIGN PATENT DOCUMENTS

DE 830 840 C 2/1952
WO WO 89/06817 A 7/1989
WO WO 99/37999 A 7/1999

OTHER PUBLICATIONS

International Search Report in International Application No. PCT/US2007/017478; mailed Jun. 3, 2008 (5 pgs).

(Continued)

*Primary Examiner*—David P Porta
*Assistant Examiner*—David S Baker
(74) *Attorney, Agent, or Firm*—Edwards Angell Palmer & Dodge LLP; Peter F. Corless

(57) ABSTRACT

A multi-photon microscope has an illumination source, an objective lens unit arranged in an optical path of the illumination source, a first light collection system arranged to collect a first portion of light emitted from a sample when the sample is illuminated by light from the illumination source, and a second light collection system arranged to collect a second portion of light emitted from the sample when the sample is illuminated by light from the illumination source. The first portion of light when collected by the first light collection system and the second portion of light when collected by the second light collection system, together provide a means of collecting as much light from as many angles as possible emanating from an emitting point source. This collection scheme has the potential to approach the total emission collection of light from an emitting point source depending on the optical properties of the sample being imaged.

18 Claims, 3 Drawing Sheets

U.S. PATENT DOCUMENTS 6,088,097 A * 7/2000 Uhl .......................... 356/318
6,169,289 B1 * 1/2001 White et al. ............. 250/458.1
6,819,411 B1 * 11/2004 Sharpe et al. ................ 356/72
2001/0028497 A1 10/2001 Uhl
2004/0217893 A1 * 11/2004 Turner ........................ 341/155

OTHER PUBLICATIONS

Written Opinion in International Application No. PCT/US2007/017478; mailed Jun. 3, 2008 (7 pgs).

* cited by examiner

WIDE-AREA FLUORESCENCE DETECTION SYSTEM FOR MULTI-PHOTON MICROSCOPY

CROSS-REFERENCE TO RELATED APPLICATION

This application claims priority to International Application No. PCT/US2007/017478, filed Aug. 6, 2007 and U.S. Provisional Application No. 60/835,462, filed Aug. 4, 2006, the entire contents of which are incorporated herein by reference.

BACKGROUND

1. Field of Invention

This application relates to microscopes and methods of microscopy, and more particularly to multi-photon microscopes and multi-photon methods of microscopy.

2. Discussion of Related Art

The contents of all references, including articles, published patent applications and patents referred to anywhere in this specification are hereby incorporated by reference.

Laser fluorescence confocal microscopy is an effective technique for producing three-dimensional images. Typically, the optical sectioning is achieved by placing a pinhole aperture in front of the emission detector. Alternatively, multi-photon fluorescence excitation microscopy (MPFM) techniques (two-photon, three-photon, second harmonic generation, sum frequency generation, etc.) can be used to provide optical sectioning by limiting fluorescence excitation to a point source in the focal plane. The technique of two-photon microscopy was introduced by Denk et al. in "Two-Photon Laser Scanning Fluorescence Microscopy", Science, Vol. 248, pp. 73-76, (April, 1990) (see also Denk et al. in U.S. Pat. No. 5,034,613). Two-photon fluorescence microscopy (TPFM) has advantages that include that it causes less damage to the biological system above and below the focal plane and that longer excitation wavelengths can be used to excite fluorescence from deeper in a sample (hundreds of microns).

In MPFM, the excitation is limited to the focal plane due to the level of spatial and temporal crowding of photons into diffraction limited spot. This crowding increases the probability of a fluorophore absorbing multiple photons before relaxation to the ground state or it increases the probability of coherent scattering events. In the case of (TPFM) in which two photons are of the same wavelength, the excited state is at twice the energy of the photons used for excitation. Since multi-photon absorption is a lower probability event than single photon absorption, a high intensity illumination source is typically required to excite a sufficient number of molecules to be detected. Once the multi-photon excitation condition is met emission light propagates in all directions from the excited spot. Since there is no need for using a pinhole aperture for optical selection the opportunity for collecting all of the light, regardless of the direction of propagation, exists for optimizing light collection. Conventional multi-photon microscopes illuminate and collect light through the same objective lens system or in conjunction with a detector placed in the trans-fluorescence pathway. This leads to detecting only a fraction of the light that is emitted from the sample. More light collection means less excitation power is needed and deeper tissue penetration is possible. Thus, there is thus a need for multi-photon microscopes that can obtain improved light collection emitted from an object being observed for a given illumination intensity.

SUMMARY

Further objects and advantages will become apparent from a consideration of the description, drawings and examples.

A multi-photon microscope according to an embodiment of the current invention has an illumination source, an objective lens unit arranged in an optical path of the illumination source, a first light collection system (usually associated with the microscope objective combined with a photo-multiplier tube, arranged to collect a first portion of light emitted from a sample when the sample is illuminated by light from the illumination source, and a second light collection system arranged to collect a second portion of light emitted from the sample, that is collecting light missed by the first light collection system, when the sample is illuminated by light from the illumination source. The first portion of light when collected by the first light collection system and the second portion of light when collected by the second light collection system, together provide enhanced light collection from the sample compared to light detected from the sample by only the first light collection system.

A method of forming an image of an object according to an embodiment of the current invention includes illuminating a portion of the object at a focused point of light of wavelength and intensity to cause multi-photon excitations at the portion of the object illuminated, detecting light emitted from the object after relaxation of the multi-photon excitations over substantially all directions of light emitted from the object, and raster-scanning the illuminating and detecting in at least multi linear directions to form the image of the object.

BRIEF DESCRIPTION OF THE DRAWINGS

The invention is described herein, by way of example only, with reference to the accompanying figures, in which like components are designated by like reference numerals, in which.

DETAILED DESCRIPTION

Figure 1:
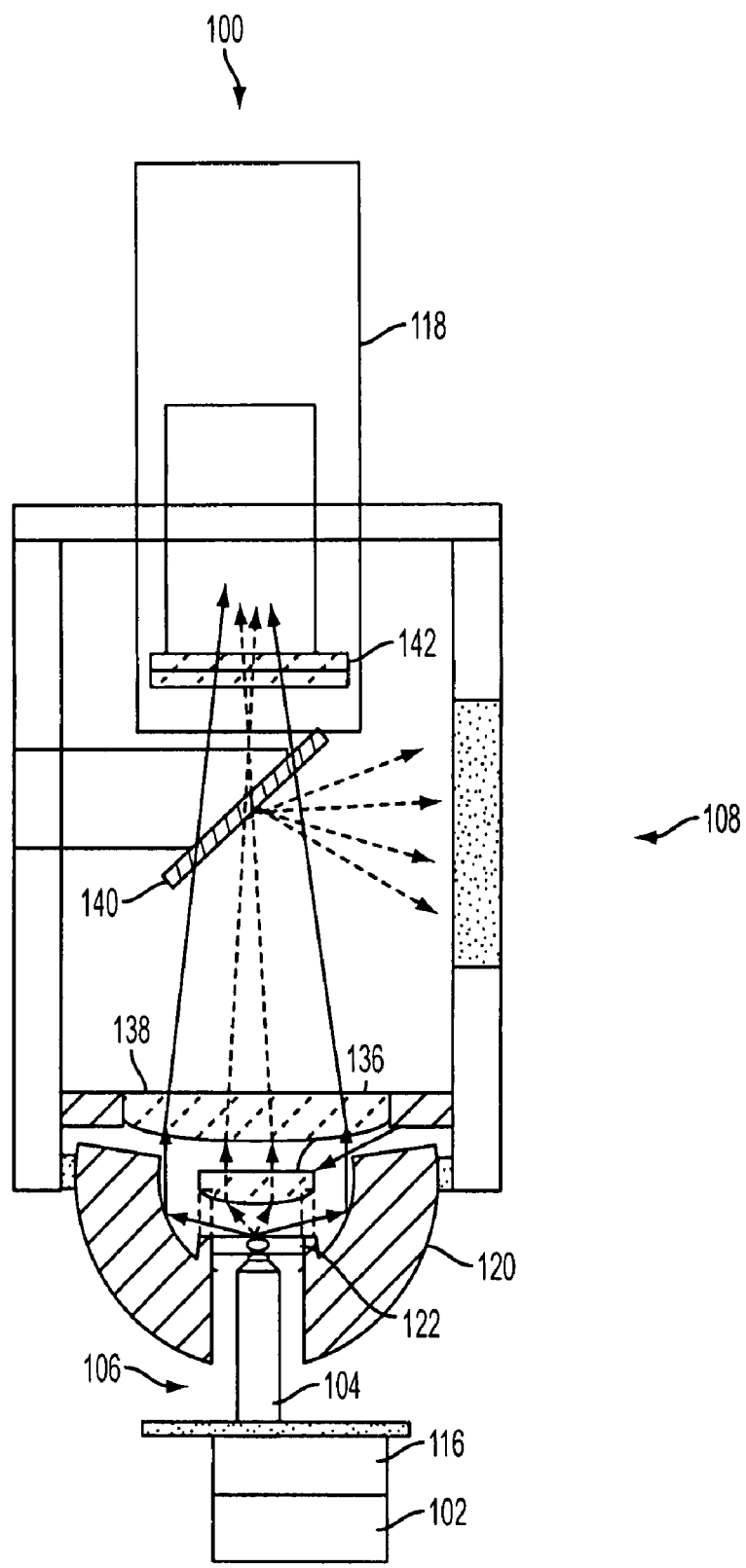
FIG. 1 is a schematic illustration of a multi-photon microscope according to an embodiment of this invention.

In describing embodiments of the present invention illustrated in the drawings, specific terminology is employed for the sake of clarity. However, the invention is not intended to be limited to the specific terminology so selected. It is to be understood that each specific element includes all technical equivalents which operate in a similar manner to accomplish a similar purpose.

Figure 2:
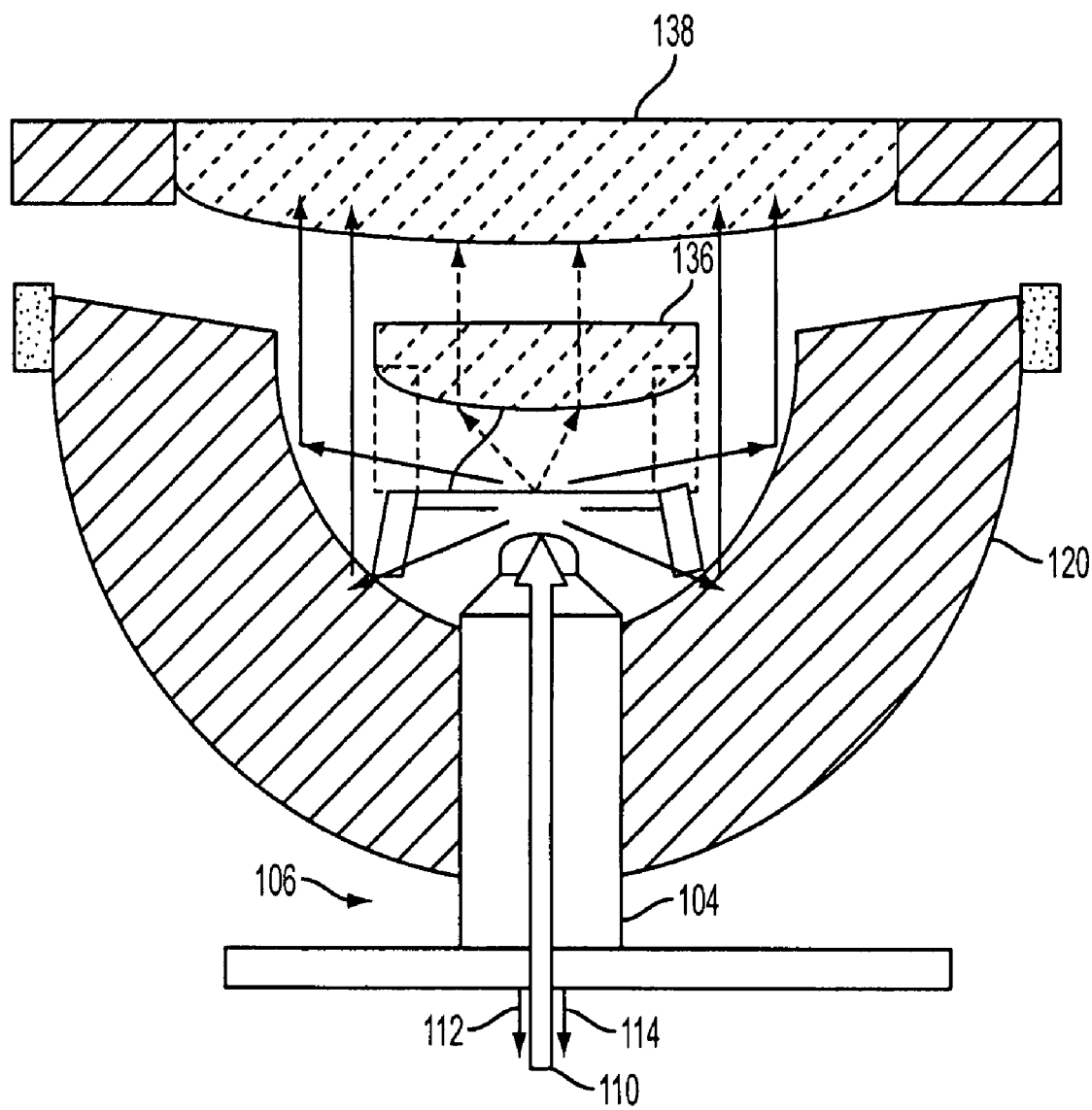
FIG. 2 is an enlarged view of a portion of the multi-photon microscope illustrated in FIG. 1.

FIG. 1 is a schematic illustration of a multi-photon microscope 100 according to an embodiment of this invention. The multi-photon microscope 100 has an illumination source 102, an objective lens unit 104, a first light collection system 106 and a second light collection system 108. The objective lens unit 104 and first light collection system 106 are shown schematically in FIG. 2 on a larger scale. The objective lens 104 is arranged in an optical path of illumination light 110 from illumination source 102 (not shown in FIG. 2). Illumination light 110 from illumination source 102 is directed through the objective lens unit 104 to be focused on a sample under observation. Some light emitted from the sample under observation travels back through the objective lens unit 104, as indicated by arrows 112 and 114. The objective lens units 104 thus also provides at least a component of the first light collection system 106 that collects light emitted from the object under observation. The objective lens system may also be an immersion objective in which a liquid having a refractive index larger than air is provided between the front lens surface and a surface of a stage holding the sample under observation. Such an immersion objective permits one to obtain a larger numerical aperture, and thus an increase in light acceptance angles.

The second light collection system 108 is arranged to collect a second portion of light emitted from the sample when illuminated with light 110 from the illumination source 102 (see FIG. 1). The first light collection system 106 includes a first light detection system 116 and the second light collection system 108 has a second light detection system 118. The second light collection system 108 may also include a reflector 120 arranged to intercept a portion of the emitted light that is missed by the objective lens (first light detection system) and to redirect it towards the second light detection system 118. A photomultiplier tube has been found to be suitable for use in the second light detection system 118. However, the invention is not limited to only the use of a photomultiplier tube in the second light detection system 118. For example, avalanche photodiode may also be suitable for some embodiments of this invention.

In one embodiment, the reflector 120 may have a parabolic reflecting surface to reflect a substantially collimated beam of light toward the second light detection system 118. In another embodiment, the reflector 120 may have an ellipsoidal reflecting surface. However, the general concepts of the invention are not limited to only parabolic and ellipsoidal reflecting surfaces. One can imagine a vast range of types of reflectors 120 that operate to reflect light towards the second light detection system 118 so as to collect light that otherwise would not have been collected. For example, the reflector 120 may have spherical reflecting surfaces for some applications without departing from the general concepts of this invention.

The multi-photon microscope 100 may also include a sample holder 122 structured and arranged to hold a sample under observation. The sample holder 122 may be arranged to hold a sample substantially at a focal point of the parabolic or ellipsoidal reflector 120. In the case of an ellipsoidal reflector 120, it may be desirable for the sample holder 122 to hold a sample substantially at one of the focal points of the ellipsoidal reflector 120 while the second light detection system 118 is arranged substantially at the second focal point of the ellipsoidal reflector 120. Consequently, light emanating from the sample under observation substantially at a first focal point of the ellipsoidal reflector 120 will come substantially to a focus at the second focal point of the ellipsoidal reflector 120. In the case of the reflector 120 having a substantially parabolic shape and with the sample holder 122 holding a sample substantially at the focal point of the parabolic surface of the reflector 120, light emitted from the sample substantially at the focal point of the reflector 120 will be directed toward the second light detection system 118 in a substantially collimated beam of light.

The sample holder 122 may be connected to a mechanism to permit one to adjust the position of a sample under observation when it is held on the sample holder 122. For example, the sample holder 122 may be connected to a mechanism which permits motion in one, two or three orthogonal directions. For example, the sample holder 122 may be connected to a mechanism that permits motion in one, two or three linear orthogonal directions such that the sample holder 122 can be displaced in upward and downward directions as viewed in the figure or in orthogonal directions along the plane of the surface of the sample holder 122.

Figure 3:
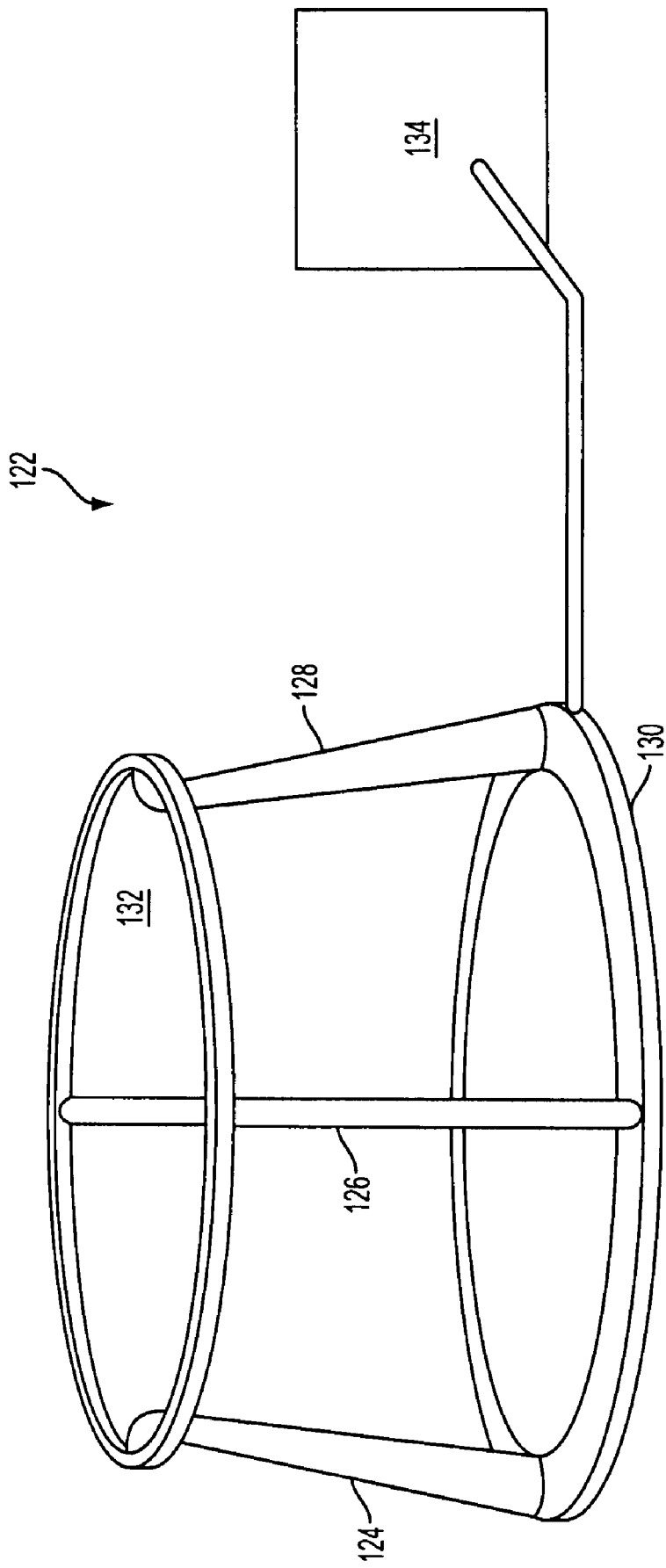
FIG. 3 is a schematic illustration of a sample holder assembly according to an embodiment of the current invention.

A suitable structure for a sample holder is illustrated schematically in FIG. 3. The sample holder 122 may have upwardly directed structures 124, 126 and 128 which are thin wire-like structures. Although three upwardly directed wire-like structures 124, 126 and 128 have been found to be suitable, the sample holder 122 is not limited to having only such a number of projections. The upwardly directed thin structures 124, 126 and 128 may be attached to a base 130 which may be a ring-like structure. The ring-like structure of base 130 permits it to be positioned around the objective lens unit 104 such that the objective lens unit 104 is positioned through the open space provided by the base 130. The upward projections 124, 126 and 128 can then extend up substantially parallel to the objective lens unit 104 to hold a stage 132 to supply support for a sample. An annular hole in the reflector 120 permits the objective lens unit 104 and portions of the sample holder 122 to pass therethrough. In the case of high resolution imaging, one would typically not move the sample holder 122 a large amount. Thus, only a small opening between the objective lens unit 104 and the reflector 120 is needed for the thin projections 124, 126 and 128 to pass therethrough. One may also construct the thin projections 124, 126 and 128 of reflective, transparent and/or otherwise non-absorbing material at the wavelengths emitted from the sample under observation to further minimize the amount of light lost before being detected by the first or second light detection systems. The sample stage 132 may be transparent to the illumination light and to the light emitted from the sample under observation. The base structure 130 is connected to a mechanism 134 that is suitable to move the structure in one, two or three orthogonal directions. The drive structure 134 may be may be selected from currently available drive structures to suite the particular application.

The second light collection system 108 may also include a converging lens 136 arranged to redirect light emitted from a sample under observation towards the second light detection system 118 to collect light that otherwise would have passed beyond an upper edge of the reflector 120 without being reflected. One may also include a focusing lens 138 to further focus light directed to the second light detection system 118. For example, when the reflector 120 has a parabolic surface the focusing lens 138 may focus the collimated beam of light onto a light detection region of the second light detection system 118. The second light collection system 108 may also have a dichroic filter 140 arranged to reflect light at the illumination wavelength and to permit light emitted from the sample to pass therethrough. The second light collection system 108 may also include filters 142 according to the desired application.

In operation, one may illuminate a sample held on the sample holder 122 by the illumination source, which may include a laser emitting a desired frequency. In MPFM, the sample under observation absorbs multiple photons such that states at multiples of the energy of the photons of the illumination light source are excited (e.g. two-photon microscopy the emitted photons are at excited to twice the energy of the illuminating photons). Some of the light emitted from a sample under observation is directed back through the objective lens unit 104, such as indicated schematically by light rays 112 and 114, to be detected by the first light detection system 116. The second light collection system 108 collects additional light emitted from the sample under observation; light that is not directed through the objective lens system 104. The reflector 120 and converging lens 136 act together to redirect a large fraction of the light that does not pass through the objective lens system 104 to direct it to the second light detection system 118. The dichroic filter 140 allows light emitted from the sample to pass substantially therethrough while reflecting light at the illumination wavelength away from the second light detection system 118. By collecting light from the first light collection system 106, as well as light from the second light collection system 108, the combined collected light provides enhanced brightness of light detected from the sample tinder observation. An image can be formed by raster scanning the stage 132 in two or three dimensions to form a corresponding two- or three-dimensional image.

The converging lens 136 and focusing lens 138 may be selected from available lenses suitable for the particular application. For example, they may be refractive lenses, diffractive lenses, gradient index lenses, or any combination thereof. The converging lens 136 and/or focusing lens 138 may be simple lens or compound lens depending on the particular application. In addition, the converging lens 136, the focusing lens 138 and/or any other optical surface through which light emitted by the sample passes may be provided with an anti-reflecting coating to decrease reflections of the light from the sample at such surfaces. Such anti-reflection coatings can thus lead to a greater amount of light emitted from the sample being detected.

The multi-photon microscope 100 according to an embodiment of this invention has a second light collection system 108 that has a reflector 120. However, general concepts of this invention are not limited to only such a structure. In other embodiments of this invention, one may use alternative structures to collect at least some light that does not pass back through the objective lens 104 and thus would have otherwise been lost rather than contributing to enhancing the brightness of a sample under observation. For example, one may utilize various optical waveguides in combination with one or more detectors to collect and detect light that does not pass through an objective lens unit 104. One may also provide one or more detectors arranged to intercept light emitted from a sample under observation to detect portions of light that do not pass through the objective lens unit 104. For example, one may essentially surround the sample with light detectors without departing from general concepts of this invention, but such an approach may be expensive using currently available detectors. All such alternatives structures are included within the general concepts of this invention.

In addition, the general concepts of this invention apply regardless of whether the multi-photon absorption is absorption of multiple equal energy photons, or multiple different energy photons.

The embodiments illustrated and discussed in this specification are intended only to teach those skilled in the art the best way known to the inventors at the time of filing to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described.

We claim:

1. A multi-photon microscope, comprising:
    an illumination source;
    an objective lens unit arranged in an optical path of the illumination source;
    a first light collection system arranged to collect a first portion of light emitted from a sample when illuminated by light from the illumination source; and
    a second light collection system arranged to collect a second portion of light emitted from the sample when illuminated by light from the illumination source,
    wherein said second light collection system is constructed and arranged to collect light emitted from the sample when illuminated by light from the illumination source that includes light emitted perpendicular to an incident direction of illumination of the sample,
    wherein the first portion of light when collected by the first light collection system and the second portion of light when collected by the second light collection system together provide enhanced brightness of light detected from the sample compared to light detected from the sample by only the first light collection system, and wherein said first light collection system and said second light collection system are constructed and arranged to collect substantially all light emitted from said sample when illuminated with light from said illumination source without said light emitted from said sample being redirected to pass again through said sample.

2. A multi-photon microscope according to claim 1, wherein the first light collection system comprises a first light detection system and the second light collection system comprises a second light detection system.

3. A multi-photon microscope according to claim 2, wherein the second light collection system comprises a reflector arranged to intercept at least a portion of light emitted from the sample when illuminated by light from the illumination source and to redirect at least a portion of the intercepted light towards the second light detection system.

4. A multi-photon microscope according to claim 3, wherein the reflector is a parabolic reflector having a reflecting surface that is shaped substantially as a portion of a parabola.

5. A multi-photon microscope according to claim 4, further comprising a sample holder arranged to hold a sample substantially at a focal point of the parabolic reflector.

6. A multi-photon microscope according to claim 5, further comprising a converging lens arranged between the sample holder and the second light detection system, wherein the converging lens is arranged to converge at least a portion of light toward the second light detection system that would not have been otherwise redirected by the parabolic reflector.

7. A multi-photon microscope according to claim 6, further comprising a focusing lens arranged between the converging lens and the second light detection system,
    wherein the focusing lens is constructed and arranged to focus light reflected from the parabolic reflector and light converged by the converging lens onto a light detection surface of the second light detection system.

8. A multi-photon microscope according to claim 7, wherein the second light detection system comprises a photomultiplier tube.

9. A multi-photon microscope according to claim 8, wherein the second light detection system further comprises a dichroic filter arranged to reflect light of wavelengths substantially equal to wavelengths of light from the illumination source while permitting light emitted from the sample when illuminated by light from the illumination source to pass therethrough.

10. A multi-photon microscope according to claim 7, wherein the focusing lens is at least one of a refractive lens, a gradient index lens, a diffractive lens, and any combination thereof.

11. A multi-photon microscope according to claim 7, wherein at least one of the converging lens and the focusing lens has an anti-reflective coating.

12. A multi-photon microscope according to claim 6, wherein the converging lens is at least one of a refractive lens, a gradient index lens, a diffractive lens, and any combination thereof.

13. A multi-photon microscope according to claim 5, wherein the sample holder is attached to a stage assembly having a three-axis adjustment mechanism that permits movement of the sample holder in one, two or three substantially orthogonal liner directions.

14. A multi-photon microscope according to claim 3, wherein the reflector is an ellipsoidal reflector having a reflecting surface that is shaped substantially as a portion of an ellipsoid.

15. A multi-photon microscope according to claim 14, further comprising a sample holder arranged to hold a sample substantially at a focal point of the ellipsoidal reflector.

16. A multi-photon microscope according to claim 15, wherein said second light detection system is arranged substantially at the second focal point of the ellipsoidal reflector that is the complement to the first-mentioned focal point of the ellipsoidal reflector.

17. A multi-photon microscope according to claim 15, wherein the sample holder is attached to a stage assembly having a three-axis adjustment mechanism that permits movement of the sample holder in one, two or three substantially orthogonal liner directions.

18. A multi-photon microscope according to claim 1, wherein said illumination source comprises a laser.

* * * * *